US011330262B2

(12) United States Patent
Liu

(10) Patent No.: US 11,330,262 B2
(45) Date of Patent: May 10, 2022

(54) LOCAL IMAGE ENHANCING METHOD AND APPARATUS

(71) Applicant: ZTE Corporation, Shenzhen (CN)

(72) Inventor: Mu Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 2177 days.

(21) Appl. No.: 14/430,755

(22) PCT Filed: Jul. 26, 2013

(86) PCT No.: PCT/CN2013/080208
§ 371 (c)(1),
(2) Date: Apr. 24, 2015

(87) PCT Pub. No.: WO2013/185699
PCT Pub. Date: Dec. 19, 2013

(65) Prior Publication Data
US 2016/0165233 A1 Jun. 9, 2016

(30) Foreign Application Priority Data
Sep. 25, 2012 (CN) .......................... 201210361220.8

(51) Int. Cl.
H04N 19/122 (2014.01)
G06T 11/60 (2006.01)
(Continued)

(52) U.S. Cl.
CPC ............ *H04N 19/122* (2014.11); *G06T 11/60* (2013.01); *H04N 19/587* (2014.11);
(Continued)

(58) Field of Classification Search
CPC .............. H04N 19/122; H04N 19/587; H04N 21/4728; H04N 21/4318; H04N 21/45455; H04N 19/124; G06T 11/60
See application file for complete search history.

(56) References Cited

U.S. PATENT DOCUMENTS

2002/0059458 A1 5/2002 Deshpande et al.
2003/0072375 A1* 4/2003 Soundararajan ... H04N 21/4728
375/240.25
(Continued)

FOREIGN PATENT DOCUMENTS

CN 1534548 A 10/2004
CN 1615029 A 5/2005
(Continued)

OTHER PUBLICATIONS

Summons to attend oral proceedings dated Dec. 18, 2017 for EP Appliaction No. 13804253.6.
(Continued)

*Primary Examiner* — Mohammed S Rahaman

(57) ABSTRACT

A local image enhancing method includes: obtaining a region or object selected by a user; generating selection parameters according to the selected region or object; enhancing the selected region or object according to the selection parameters, and generating an image of the enhanced selected region or object; or, sending the selection parameters to a peer end; the peer end enhancing the selected region or object according to the selection parameters; returning the image of the enhanced selected region or object. The embodiments of the present document further provide a local image enhancing apparatus. The embodiments of the present document may enhance the corresponding region according to the user selection.

5 Claims, 7 Drawing Sheets

(51) Int. Cl.
  *H04N 21/4728* (2011.01)
  *H04N 19/587* (2014.01)
  *H04N 21/431* (2011.01)
  *H04N 21/4545* (2011.01)
  *H04N 19/124* (2014.01)

(52) U.S. Cl.
  CPC ....... *H04N 21/4728* (2013.01); *H04N 19/124* (2014.11); *H04N 21/4318* (2013.01); *H04N 21/45455* (2013.01)

(56) References Cited

U.S. PATENT DOCUMENTS

| | | |
|---|---|---|
| 2004/0202378 A1 | 10/2004 | Rising et al. |
| 2006/0028488 A1* | 2/2006 | Gabay .................. H04L 65/607 345/626 |
| 2006/0062478 A1* | 3/2006 | Cetin .................. H04N 19/132 382/232 |
| 2006/0215753 A1* | 9/2006 | Lee ........................ H04N 7/147 375/240.08 |
| 2007/0097268 A1 | 5/2007 | Relan et al. |
| 2007/0165959 A1* | 7/2007 | Takada ................. H04N 19/124 382/240 |
| 2008/0092172 A1 | 4/2008 | Guo et al. |
| 2008/0225116 A1 | 9/2008 | Kang et al. |
| 2009/0216769 A1 | 8/2009 | Bellwood et al. |
| 2012/0207452 A1 | 8/2012 | Wang et al. |

FOREIGN PATENT DOCUMENTS

| | | |
|---|---|---|
| CN | 101061507 A | 10/2007 |
| CN | 101171841 A | 4/2008 |
| CN | 102025965 A | 4/2011 |

OTHER PUBLICATIONS

Chinese Office Action of Application No. 201210361220.8, dated Aug. 15, 2016.
International Search Report of PCT/CN2013/080208, dated Nov. 7, 2013.
Supplementary European Search Report of EP 13804253, dated Nov. 17, 2015.
IEEE Transactions on Circuits and Systems for Video Technology, vol. 13, No. 7, Jul. 2003, Overview of the H.264/AVC Video Coding Standard, 17 pages.

* cited by examiner

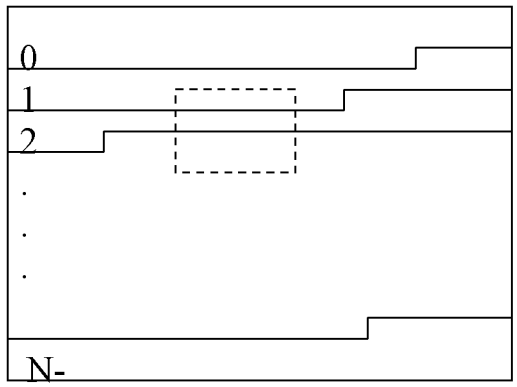
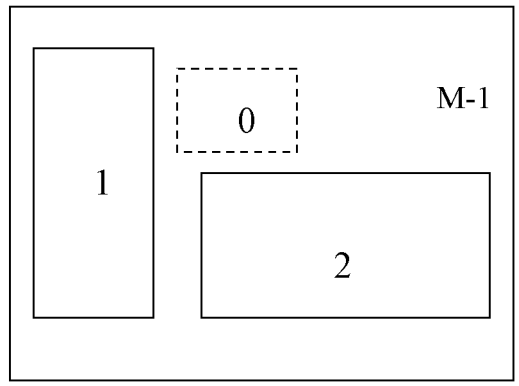
FIG. 8(a)              FIG. 8(b)
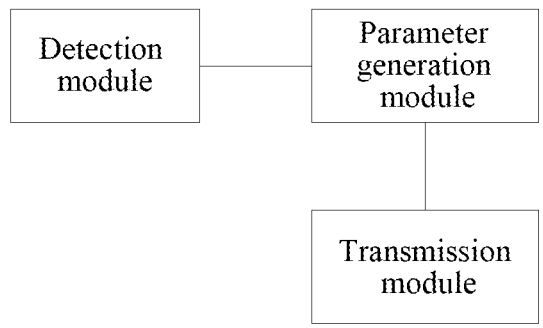
FIG. 9
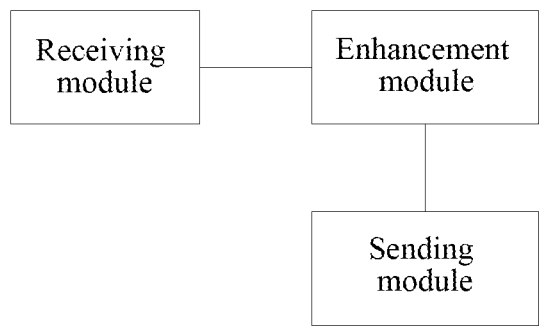
FIG. 10

LOCAL IMAGE ENHANCING METHOD AND APPARATUS

TECHNICAL FIELD

The present document relates to the field of communications, and particularly, to a local image enhancing method and apparatus.

BACKGROUND OF THE RELATED ART

In the existing video communication systems, users generally improve image quality through a method of increasing call bandwidth or selecting a clear mode if they are not satisfied with the image quality when in use, thus the encoder changes the encoding of the whole image, although the quality of the whole image is improved, the result of doing so is that the bandwidth is significantly increased or the frame rate cannot be guaranteed. But in general cases, users do not require very high quality for the whole image but are more interested in some contents or individual objects in the image, thus increasing the call bandwidth or selecting the clear mode will have other unnecessary consequences, while the method of adjusting the position or the focal length of a far-end camera to zoom in the region or object of interest will change the content of the whole image.

Furthermore, in some devices, although local content in the image can be enhanced, some are adaptive enhancement for a specific object such as human face, and some are amplification processing for a specified region. Some of these techniques cannot allow a user to freely select a region of interest according to the user's own subjective preferences, and some only perform some processing on a local region of the decoded-out image at the decoding end to change people's subjective feelings on the image, and still some change the overall layout and content of the image.

In summary, the existing image enhancing method needs to be improved.

SUMMARY

The technical problem to be solved by the embodiments of the present document is to provide a local image enhancing method and apparatus to enhance according to a user's preferences.

To solve the abovementioned problem, the embodiments of the present document provide a local image enhancing method, comprising:

obtaining a region or object selected by a user;

generating selection parameters according to the selected region or object;

sending the selection parameters to a peer end; or, enhancing the selected region or object according to the selection parameters, and generating an image of the enhanced selected region or object.

Alternatively, the method further comprises obtaining an enhancement mode, or, an enhancement mode and an enhancement level, selected by the user;

the selection parameters further comprise: an enhancement mode, or, an enhancement mode and an enhancement level.

Alternatively, the enhancement mode is one of the following:

a forward enhancement mode indicative of increasing image quality of the selected region or object;

a reverse enhancement mode indicative of decreasing image quality of the selected region or object;

a replacing mode indicative of using another image to replace the selected region or object;

a non-enhancement mode indicative of the image quality of the selected region or object being a system default.

Alternatively, the selection parameters further comprise:

a tracking mode, wherein the tracking mode is one of the following:

a fixed mode indicative of enhancing each frame in the selected region before canceling the enhancement;

a dynamic mode indicative of tracking the selected object for each frame before canceling the enhancement, and enhancing the object when the object is within the enhancement range.

Alternatively, before generating the selection parameters, it is further judged whether the peer end supports local enhancement encoding and whether the selected region or object meets preset conditions, and only when the peer end supports the local enhancement encoding and the selected region or object meets the preset conditions, are the selection parameters generated.

Alternatively, the step of enhancing the selected region or object comprises:

when the selection parameters are indicative of increasing image quality of the selected region or object, using one of the following modes or a combination thereof:

using an I_PCM encoding mode to encode an image of the selected region or object;

encoding the image of the selected region or object by decreasing a quantization parameter of encoded macroblocks;

encoding the image of the selected region or object by increasing codewords of the encoded macroblocks;

when the selection parameters are indicative of decreasing image quality of the selected region or object, using one of the following modes or a combination thereof:

encoding an image of the selected region or object by increasing a quantization parameter of encoded macroblocks;

encoding the image of the selected region or object by decreasing codewords of the encoded macroblocks;

blurring and then encoding the image of the selected region or object.

The embodiments of the present document further provide a local image enhancing method, comprising:

receiving selection parameters sent by a peer end and generated according to a region or object selected by a user;

enhancing the selected region or object according to the selection parameters;

sending an image of the enhanced selected region or object to the peer end.

Alternatively, the step of enhancing the selected region or object comprises:

enhancing the selected region or object according to an enhancement mode, or, an enhancement mode and an enhancement level in the selection parameters.

Alternatively, the step of enhancing the selected region or object comprises:

when the selection parameters are indicative of increasing image quality in the selected region or object, using one of the following modes or a combination thereof:

using an I_PCM encoding mode to encode an image of the selected region or object;

encoding the image of the selected region or object by decreasing a quantization parameter of encoded macroblocks;

encoding the image of the selected region or object by increasing codewords of the encoded macroblocks;

when the selection parameters are indicative of decreasing image quality of the selected region or object, using one of the following modes or a combination thereof:

encoding an image of the selected region or object by increasing a quantization parameter of encoded macroblocks;

encoding the image of the selected region or object by decreasing codewords of the encoded macroblocks;

blurring and then encoding the image of the selected region or object.

Alternatively, the step of enhancing the selected region or object according to the selection parameters comprises:

encoding the selected region or object as a separate slice;

before sending an image of the enhanced selected region or object to the peer end, further taking the separate slice as an individual network adaptation layer unit, and setting a specific transport priority for the network adaptation layer unit.

Alternatively, before enhancing the selected region or object according to the selection parameters, it is further judged whether the selection parameters meet preset conditions, and if yes, the selected region or object is enhanced according to the selection parameters.

The embodiments of the present document further provide a local image enhancing apparatus, comprising a detection module, a parameter generation module and a transmission module, wherein:

the detection module is configured to obtain a region or object selected by a user;

the parameter generation module is configured to generate selection parameters according to the selected region or object;

the transmission module is configured to send the selection parameters to the peer end.

Alternatively, the parameter generation module is further configured to obtain an enhancement mode, or, an enhancement mode and an enhancement level, selected by the user, and add the enhancement mode, or, the enhancement mode and enhancement level, to the selection parameters.

Alternatively, the enhancement mode is one of the following:

a forward enhancement mode indicative of increasing image quality of the selected region or object;

a reverse enhancement mode indicative of decreasing image quality of the selected region or object;

a replacing mode indicative of using another image to replace the selected region or object;

a non-enhancement mode indicative of the image quality of the selected region or object being a system default.

Alternatively, the selection parameters further comprise: a tracking mode, wherein the tracking mode is one of the following:

a fixed mode indicative of enhancing each frame in the selected region before canceling the enhancement;

a dynamic mode indicative of tracking the selected object for each frame before canceling the enhancement, and enhancing the object when the object is within an enhancement range.

Alternatively, before the parameter generation module generates the selection parameters, it is further judged whether the peer end supports local enhancement encoding, and whether the selected region or object meets preset conditions, and only when the peer end supports the local enhancement encoding and the selected region or object meets the preset conditions, are the selection parameters generated.

The embodiments of the present document further provide a local image enhancing apparatus, comprising a receiving module, an enhancement module and a sending module, wherein:

the receiving module is configured to receive selection parameters sent by a peer end and generated according to a region or object selected by a user;

the enhancement module is configured to enhance the selected region or object according to the selection parameters;

the sending module is configured to send an image of the enhanced selected region or object to the peer end.

Alternatively, the step of the enhancing module enhancing the selected region or object comprises:

enhancing the selected region or object according to an enhancement mode, or, an enhancement mode and an enhancement level, in the selection parameters.

Alternatively, the step of the enhancing module enhancing the selected region or object comprises:

when the selection parameters are indicative of increasing image quality of the selected region or object, using one of the following modes or a combination thereof:

using an I_PCM encoding mode to encode an image of the selected region or object;

encoding the image of the selected region or object by decreasing a quantization parameter of encoded macroblocks;

encoding the image of the selected region or object by increasing codewords of the encoded macroblocks;

when the selection parameters are indicative of decreasing image quality of the selected region or object, using one of the following modes or a combination thereof:

encoding an image of the selected region or object by increasing a quantization parameter of encoded macroblocks;

encoding the image of the selected region or object by decreasing codewords of the encoded macroblocks; and blurring and then encoding the image of the selected region or object.

Alternatively, the enhancement module is further configured to encode the selected region or object as a separate slice;

the sending module is further configured to take the separate slice as an individual network adaptation layer unit, and set a specific transport priority for the network adaptation layer unit.

Alternatively, before the enhancement module enhances the selected region or object according to the selection parameters, it is further judged whether the selection parameters meet preset conditions, and if yes, the selected region or object is enhanced according to the selection parameters.

The embodiments of the present document further provide a local image enhancing apparatus, comprising a detection module, a parameter generation module and an enhancement module, wherein:

the detection module is configured to obtain a region or object selected by a user;

the parameter generation module is configured to generate selection parameters according to the selected region or object and send the selection parameters to the enhancement module;

the enhancement module is configured to enhance the selected region or object according to the selection parameters, and generate an image of the enhanced selected region or object.

Alternatively, the parameter generation module is further configured to obtain an enhancement mode, or, an enhancement mode and an enhancement level, selected by the user, and add the enhancement mode, or, the enhancement mode and enhancement level, to the selection parameters;

the enhancement module enhancing the selected region or object comprises:

enhancing the selected region or object according to the enhancement mode, or, the enhancement mode and enhancement level, in the selection parameters.

Alternatively, the enhancement mode is one of the following:

a forward enhancement mode indicative of increasing image quality of the selected region or object;

a reverse enhancement mode indicative of decreasing image quality of the selected region or object;

a replacing mode indicative of using another image to replace the selected region or object;

a non-enhancement mode indicative of the image quality of the selected region or object being a system default.

Alternatively, the selection parameters further comprise: a tracking mode, wherein the tracking mode is one of the following:

a fixed mode indicative of enhancing each frame in the selected region before canceling the enhancement;

a dynamic mode indicative of tracking the selected object for each frame before canceling the enhancement, and enhancing the object when the object is within an enhancement range.

Alternatively, the step of the enhancement module enhancing the selected region or object comprises:

when the selection parameters are indicative of increasing image quality of the selected region or object, using one of the following modes or a combination thereof:

using an I_PCM encoding mode to encode an image of the selected region or object;

encoding the image of the selected region or object by decreasing a quantization parameter of encoded macroblocks;

encoding the image of the selected region or object by increasing codewords of the encoded macroblocks;

when the selection parameters are indicative of decreasing image quality of the selected region or object, using one of the following modes or a combination thereof:

encoding an image of the selected region or object by increasing a quantization parameter of encoded macroblocks;

encoding the image of the selected region or object by decreasing codewords of the encoded macroblocks;

blurring and then encoding the image of the selected region or object.

The local image enhancing method and apparatus provided in the embodiments of the present document allow users to select image quality of a region or object of their own interest fully according to their own preferences; furthermore, it can achieve lossless enhancement; in addition, it can further decrease image quality of the region or object selected by the users. Certainly, any product carrying out the embodiments of the present document does not necessarily need to reach all of the abovementioned advantages at the same time.

BRIEF DESCRIPTION OF THE DRAWINGS

FIG. 8(a) is a schematic diagram of performing local image enhancement using a slice group in a raster scanning format;

FIG. 8(b) is a schematic diagram of performing local image enhancement using a slice group in a FMO format.

FIG. 9 is a block diagram of a local image enhancing apparatus in accordance with one embodiment of the present document;

FIG. 10 is a block diagram of a local image enhancing apparatus in accordance with one embodiment of the present document;

PREFERRED EMBODIMENTS OF THE INVENTION

Figure 1A:
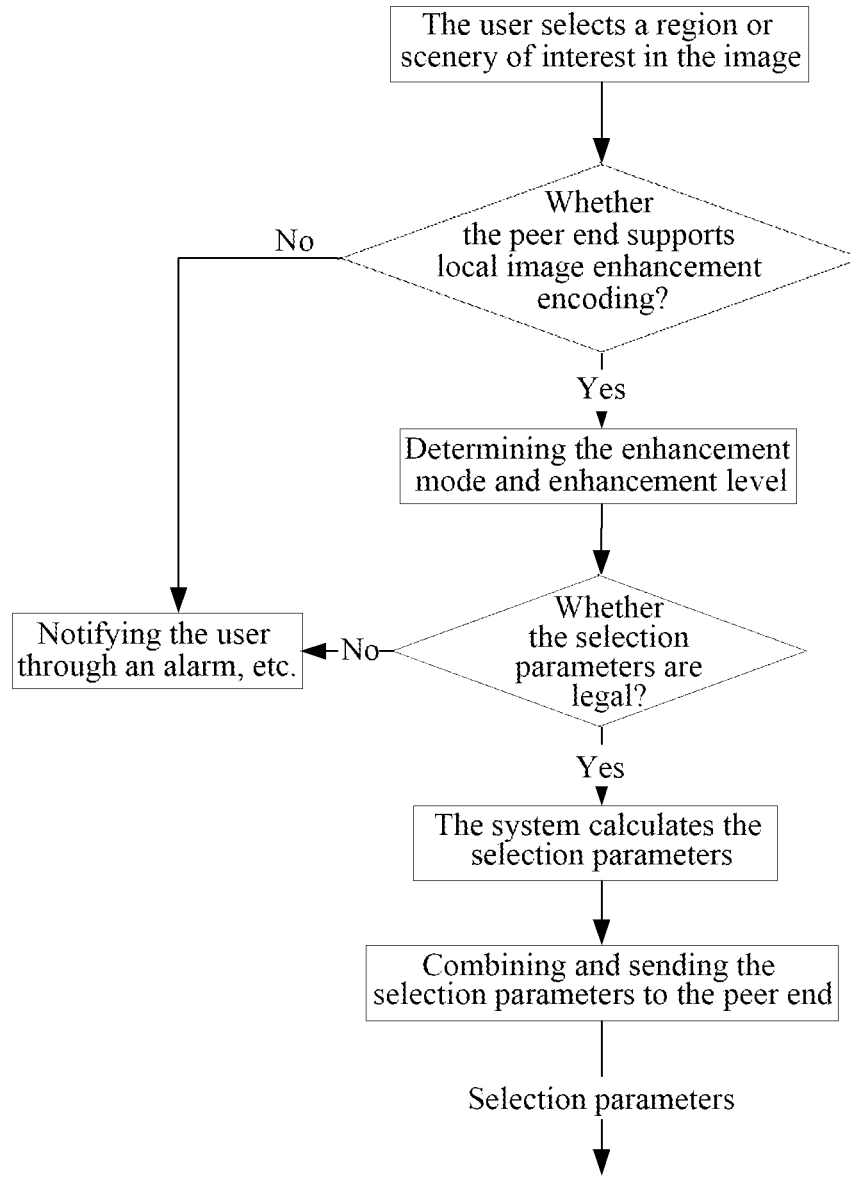
FIG. 1(a) is a flow chart of near-end processing in a local image enhancing method.

To make purposes, technical solutions and advantages of the embodiments of the present document clearer, the embodiments of the present document will be expounded in conjunction with the accompanying drawings as below. It should be noted that in the case of no conflict, embodiments and features in the embodiments of the present application may be arbitrarily combined with each other.

The embodiments of the present document provide a local image enhancing method, comprising:

obtaining a region or object selected by a user;

generating selection parameters according to the selected region or object;

sending the selection parameters to a peer end; or, enhancing the selected region or object according to the selection parameters, and generating an image of the enhanced selected region or object.

Wherein, the method further comprises obtaining an enhancement mode, or, an enhancement mode and an enhancement level, selected by the user;

the selection parameters further comprise: an enhancement mode, or, an enhancement mode and an enhancement level. Of course, the enhancement mode and enhancement level may also use system defaults and do not need to be selected by the user, and at this time, the selection parameters may not carry the enhancement mode or the enhancement level.

Wherein, the enhancement mode is one of the following:

a forward enhancement mode indicative of increasing image quality of the selected region or object;

a reverse enhancement mode indicative of decreasing image quality of the selected region or object;

a replacing mode indicative of using another image to replace the selected region or object;

a non-enhancement mode indicative of the image quality of the selected region or object being a system default.

Wherein, the selection parameters further comprise: a tracking mode, the tracking mode being one of the following:

a fixed mode indicative of enhancing each frame in the selected region before canceling the enhancement;

a dynamic mode indicative of tracking the selected object for each frame before canceling the enhancement, and enhancing the object when the object is within the enhancement range.

Wherein, before generating the selection parameters, it is further judged whether the peer end supports local enhancement encoding and whether the selected region or object meets preset conditions, and only when the peer end supports the local enhancement encoding and the selected region or object meets the preset conditions, are the selection parameters generated. Judgment may also be not performed, and when the user is selecting, the user is restricted to only select a region or object that meets the preset conditions.

Wherein, the step of enhancing the selected region or object comprises:

when the selection parameters are indicative of increasing image quality of the selected region or object, using one of the following modes or a combination thereof:

using an I_PCM encoding mode to encode an image of the selected region or object;

encoding the image of the selected region or object by decreasing a quantization parameter of encoded macroblocks;

encoding the image of the selected region or object by increasing codewords of the encoded macroblocks;

when the selection parameters are indicative of decreasing image quality of the selected region or object, using one of the following modes or a combination thereof:

encoding an image of the selected region or object by increasing a quantization parameter of encoded macroblocks;

encoding the image of the selected region or object by decreasing codewords of the encoded macroblocks;

blurring and then encoding the image of the selected region or object.

The embodiments of the present document further provide a local image enhancing method, comprising:

receiving selection parameters sent by a peer end and generated according to a region or object selected by a user;

enhancing the selected region or object according to the selection parameters;

sending an image of the enhanced selected region or object to the peer end.

Wherein, the step of enhancing the selected region or object comprises:

enhancing the selected region or object according to an enhancement mode, or, an enhancement mode and an enhancement level in the selection parameters.

Wherein, the step of enhancing the selected region or object comprises:

when the selection parameters are indicative of increasing image quality in the selected region or object, using one of the following modes or a combination thereof:

using an I_PCM encoding mode to encode an image of the selected region or object;

encoding the image of the selected region or object by decreasing a quantization parameter of encoded macroblocks;

encoding the image of the selected region or object by increasing codewords of the encoded macroblocks;

when the selection parameters are indicative of decreasing image quality of the selected region or object, using one of the following modes or a combination thereof:

encoding an image of the selected region or object by increasing a quantization parameter of encoded macroblocks;

encoding the image of the selected region or object by decreasing codewords of the encoded macroblocks;

blurring and then encoding the image of the selected region or object.

Wherein, the step of enhancing the selected region or object according to the selection parameters comprises:

encoding the selected region or object as a separate slice;

before sending an image of the enhanced selected region or object to the peer end, further taking the separate slice as an individual network adaptation layer unit, and setting a specific transport priority for the network adaptation layer unit.

Wherein, before enhancing the selected region or object according to the selection parameters, it is further judged whether the selection parameters meet preset conditions, and if yes, the selected region or object is enhanced according to the selection parameters.

In the embodiment introduced below, each of the communicating parties calls itself the local end and calls the other party the peer end, and for the convenience of description, one of the communicating parties is called the near end and the other is called the far end.

In a video communication system, if users are allowed to freely select a region or object of their own interest in an image range visible to themselves, and the users are allowed to specify video effect they want to achieve in the region or object of their own interest, the encoding end performs corresponding special encoding on the specified region or object according to the users' needs, and then sends the locally and specially encoded code stream to the user end to decode and display, so that the video effect the users want to view can be achieved. The benefits of using this method are that users are allowed to select image quality of a region or object of their own interest fully according to their own preferences, and if the region range specified by the user is not significantly large, the bandwidth occupied by the video code stream will be not significantly increased, and it is possible to keep proportion coordination in various parts of the entire image without changing the resolution of the region or object of the user's interest, enhancing user experience.

In the embodiment of the present document, in the process of using a video communication system, users can select part of the selected image or individual object content in the image according to their own needs and preferences, and then send parameters of selecting a local image or individual object to the peer end, and the processor at the peer end analyzes the users' needs, and if the needs can be met, notifies the encoder of performing enhancement on the effect specified by the users. The content selected by the user can be a fixed coordinate position and range, and can also be an object moving in the image, and when the users select to cancel the enhancement or the moving object moves out of the image, the local image enhancement encoding is cancelled.

According to a specific embodiment, a system and method for allowing users to freely select a specific image effect of a region or object of their own interest in an image are provided, and the method gives the users greater autonomous selectivity on image quality, thereby avoiding the shortcomings and problems in the previous video communication systems that the users cannot freely select local image effect.

In a specific embodiment, a video communication system using the local image enhancement technology at least comprises a device capable of allowing users to freely select a region or object of their own interest in an image, and the system further should at least comprise an device capable of performing specified effect encoding on a specified local image or object. The system further supports the functions capable of judging, calculating and sending parameters of the region or object selected by the user to an encoding device, and likewise, the encoding device should also have the functions of receiving, judging, and converting the user selection parameters into encoding parameters identifiable by the encoder before encoding. The flow chart of a specific embodiment is as shown in FIG. 1(a) and FIG. 1(b).

Figure 1B:
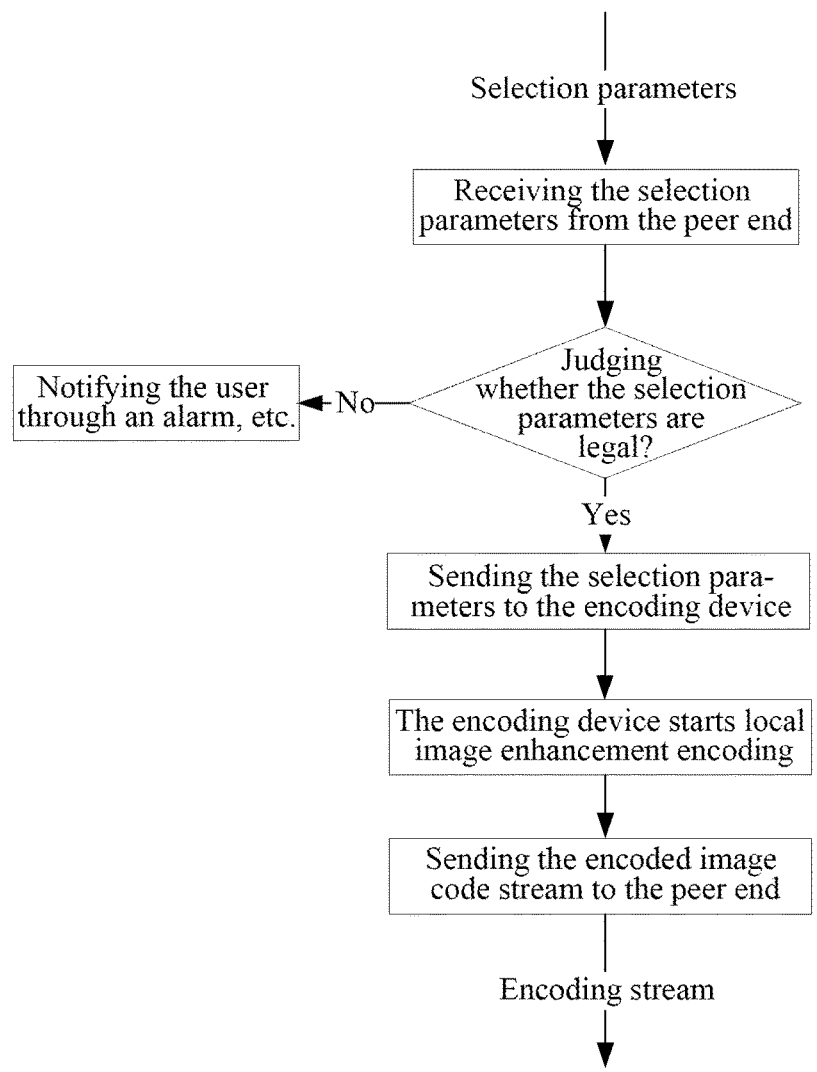
FIG. 1(b) is a flow chart of far-end processing in the local image enhancing method.

As shown in FIG. 1(a), at the near end, in step A10, it is to receive a region or object selected by the user;

in step A20, it is to judge whether the far end supports local image enhancement encoding, and if not, it is to turn to step A70, and if yes, it is to turn to step A30;

in step A30, it is to determine the enhancement mode and enhancement level;

certainly, it may also be to only determine the enhancement mode or the enhancement level;

in step A40, it is to judge whether the selection parameters are legal, and if legal, it is to turn to step A50, and if illegal, it is to turn to step A70;

in step A50, the system calculates the selection parameters;

in step A60, it is to combine and send the selection parameters to the peer end (it refers to the peer end of the near end here, that is, the far end), and end;

in step A70, it is to notify the user through an alarm that the local enhancement cannot be performed, and end.

As shown in FIG. 1(b), at the far end, in step B10, it is to receive the selection parameters sent by the peer end (it refers to the peer end of the far end here, that is, the near end);

in step B20, it is to judge whether the selection parameters are legal; if legal, it is to turn to step B30, and if illegal, it is to turn to step B60;

in step B30, it is to send the selection parameters to the encoding device;

in step B40, the encoding device starts to perform the encoding of specified effect on the region or object selected by the user;

the specific enhancement mode can refer to the subsequent embodiments.

In step B50, it is to send the image code stream after local enhancement encoding to the peer end (i.e., the near end), and end;

in step B60, it is to notify the user through an alarm that the enhancement cannot be performed, and end.

In the abovementioned embodiment, the process of users specifying a local image or object is that the users select a region or object of their own interest in the image according to the support situation of the system device, and the device and method for supporting users to freely select a region or object of interest are not fixed in a certain device or a certain method, but are available as long as a user can use them to specify a region or target of the user's own interest in the image.

In the abovementioned embodiment, performing the encoding of specified effect means that users set encoding effect for the selected region or object by themselves, and then the encoding device encodes the corresponding region or object according to the effect specified by the user. The encoding effect generally can be divided into four modes: forward enhancement, reverse enhancement, alternative and non-enhancement, wherein:

the forward enhancement mode refers to a mode requiring higher image encoding quality, and the encoded image quality at this time is higher than the image encoding quality in the system default case, and in this mode, high and low enhancement levels can be set to achieve different video quality effects;

the reverse enhancement mode refers to a mode requiring worse image encoding quality, and the image encoding quality at this time is worse than the image encoding quality in the system default case, and in this mode, high and low enhancement levels can be set to achieve different video quality effects;

the replacing mode refers to an encoding mode in which another image or object is used to replace an image or object in the region specified by the user, and the coded image at this time no longer has the same content as the encoded image defaulted by the system in the region or object specified by the user, and the content in the original region or the original object has been replaced by new content or object;

the non-enhancement mode is a mode in which no special encoding processing is performed for the region or object selected by the user, and encoding is performed with the default encoding effect.

The abovementioned modes are examples only, and other modes can be set as needed.

Since users can freely select an enhancement mode needed by them, in order to avoid repeatedly describing these four parallel enhancement modes, the "enhancement" mentioned in the text comprises the four modes: forward enhancement, reverse enhancement, alternative, and non-enhancement, unless otherwise specified.

In the abovementioned embodiment, the parameters of the region or object selected by the user are some numerical values, and may comprise the following information: 1) the position (e.g., horizontal and vertical coordinates) of the region selected by the user in the image or the range (e.g., the width and height of the selected region), or the serial number of the object selected by the user in the image; 2) parameters of the image quality effect desired by the user, including the enhancement mode and the enhanced level as well as the local enhancement parameters of canceling the current region or the specified object; 3) the tracking mode of the specified region or object in the image, including a fixed mode and a dynamic mode, wherein the fixed mode refers to performing image enhancement encoding for each frame at a fixed position before canceling the enhancement and after the user selects the enhanced region or object, and the so-called dynamic mode refers to that, when the object within the region selected by the user or the object selected by the user moves, the position of the region on which enhancement coding is performed will also change with the movement of the object within the region selected by the user or the object selected by the user, so the object within the region selected by the user or the object selected by the user is always within the enhancement encoding range. Wherein the two tracking modes described in 3) can be combined into one adaptive tracking mode, that is, the encoder can automatically change the position of the enhancement encoding region according to the movement of the object within the region selected by the user or the object selected by the user, so that the object within the region selected by the user or the object selected by the user is always within the enhancement encoding range.

In the abovementioned embodiment, the process of judging, calculating and sending the parameters of the region or object selected by the user to the encoding device is operations carried out by the system after the user selects the region or object of interest. The system first judges whether the parameters are legal, and first needs to judge whether the encoding device supports the local enhancement encoding, and if not, it notifies the user via an alarm that the system cannot complete the effect desired by the user; if the encoding device supports the local enhancement encoding, it should continue to judge whether the parameters such as the range and position selected by the user are legal, for example, the parameters that exceed the maximum display range of the screen, and the image range that is too small or too narrow all can be considered to be illegal. Calculating the parameters comprises converting the parameters into other forms which can be easily represented, or adjusting the parameters to values which are easy to be encoded by the encoder, for example, the range selected by the user is not necessarily a straight line and then it is needed to adjust the selected boundary to straight-line boundary, or the position of the boundary selected by the user is a position in an odd row or an odd column of pixels that is not easily to be encoded, and at this time the boundary can be adjusted to a boundary position of 16×16 pixel blocks closest to this boundary. For the parameters which are determined to be legal by the system and are calculated and adjusted, they also need to be combined into a form which can be received and analyzed by the encoding device and sent to the encoding device, the parameter combination form and the parameter sending mode are performed in a scheme supported and negotiated by the system, and are not fixed to a certain scheme.

In the abovementioned embodiment, the process of the system selecting, judging, and then converting the parameters into encoding parameters identifiable by the encoder is performed before the system performs the local video enhancement encoding. After receiving the selection parameters, the system first analyzes the received parameters according to the actual situation of the system and the support situation of the encoding device, and determines their legitimacy, and for illegal selection parameters, notifies the user in appropriate forms of which parameters are illegal and of the situation of the illegal parameters, while for the selection parameters which are analyzed and determined to be legal, continues to convert them into a form identifiable by the encoding device and send them to the encoding device for local image enhancement encoding.

In the embodiment to be introduced below, the communication parties are referred to as the near end and the far end, near-end users select a region or object of their own interest in the viewing far-end image; the encoding device at the far end enhances the region of the users' interest or the object in the image, and then sends the enhanced video stream to the near end, after the video stream is received by the near end, the far-end image desired by the users can be displayed after the video stream is decoded and outputted via display, and the far-end image comprises the locally enhanced object or the object.

In some embodiments, the device at the near end that allows users to freely select a region or object of interest in the image may be a display capable of displaying the far-end image and performing a local selection operation for the image, and the near end comprises a function module capable of judging, calculating and sending the parameters of the region or object selected by the user, the far end should comprise at least one image acquisition device to acquire an image at the far end, and the far end also comprises a function module capable of receiving the parameters of the image region or object of the users' interest sent by the near end, and analyzing, judging and sending the parameters to the encoding device, and the far end further comprises an encoding device which supports local video enhancement encoding. For some specific embodiments, the near end and the far end are relative. For example, for a video conference system supporting the local image enhancement technology, assume that both ends of the system are A end and B end, respectively, if the A end is set as the near end, then the B end is the far end; likewise, if the B end is set as the near end, then the A end is the far end, so the A end and the B end can have both a local image selection device and a local image enhancement encoding device, and in such case, when the A end and the B end are in a meeting, users at the A end view an image at the B end, and the users at the A end can select a region or object of their own interest in the image at the B end, and the B end is notified to perform local enhancement encoding, the B-end device sends an encoded, locally enhanced video stream to the A end, which is decoded by the decoding device at the A end and then displayed by the display device at the A end; likewise, the users at the B end view an image at the A end, and the users at the B end can select a region or object of their own interest in the image at the A end that is viewed by the users, and require the A end to perform local enhancement encoding, thereby viewing the image locally enhanced by the A end.

In some embodiments, the communication parties, the A end and the B end, are not necessarily required to both have a local image selection device and a local image enhancement encoding device at the same time, but one end in the communication parties has one of the local image selection device and the local image enhancement encoding device, and the other end has the other one of the local image selection device and the local image enhancement encoding device, such communication system can realize that users unidirectionally view a far-end image and select a region or object of their own interest in the far-end image according to their own needs and allows the image encoding device at the far end to encode the image stream required by them. Such communication system, e.g. a streaming media system, a VOD (video-on-demand) system as well as a video surveillance system, can use the framework of the present embodiment.

In some embodiments, at the near end is provided a display capable of displaying a far-end image for facilitating the users to view the far-end image, but the device capable of allowing users to freely select a region or object of interest in an image may not be in the same terminal or device as the display but is in a controlling device at the near end, the controlling device may be called console, there is a page on the display device of the console that may display the far-end image in real time, and users select a region or object of their own interest in the far-end image displayed on the page of the console via a device such as a mouse or handwriting, and then the selection parameters are sent to the far end to make the far end perform local enhancement encoding, and finally the users can view the locally enhanced far-end image on the display at the local end.

In some embodiments, the user selection device and the local image enhancement encoding device that are capable of allowing users to freely select a region or object of interest in an image can be integrated in the same device or the same end device of the system, that is, the image that the users select to view is an image at the local end, and after the users select a region or object of interest in the image, the system sends the selection parameters to the local image enhancement encoding device at the local end, and the local image enhancement encoding device at the local end performs local image enhancement encoding on the image acquired by a video camera at the local end. The present embodiment can be used in a device or system such as a camera device, a video camera device, as well as a local self-loop system of video conferencing.

In some embodiments, the local image enhancement encoding in the forward enhancement mode is achieved by performing high-quality encoding on the image of the region selected by the user or the object selected by the user, such high-quality encoding may be I_PCM encoding, and the I_PCM encoding is an encoding intra-frame mode supported by the H.264 standard, and in this mode the encoder directly outputs pixel values without prediction and transformation, since the I_PCM encoding mode is a lossless encoding while other encoding modes supported by the H.264 are lossy, using the I_PCM encoding mode allows the image quality of the region or object of the user's interest to have the same effect as the original image quality prior to the encoding. Because the I_PCM encoding mode will take up more bandwidth, in the case of limited bandwidth, the encoding effect of the image other than the region or object of the user's interest may be reduced, and the saved bandwidth is used in a region in which the I_PCM encoding is used; in addition, a method for reducing the frame rate of the encoding may be used to save the bandwidth so as to ensure the image quality of the region of the user's interest. Of course, in addition to the H.264 video compression standard, the H.265 and other video compression standards including the customized encoding methods, if they also support lossless compression, can also be used in the present embodiment to encode out an image effect with the highest quality.

In some embodiments, the encoding methods used by the local image enhancement encoding in the forward enhancement mode and the local image enhancement encoding in the reverse enhancement mode are implemented by changing the number of codewords assigned to encoded macroblocks, wherein, when the forward enhancement mode is used, different encoding strategies may be used as required, for example, the I_PCM encoding may be used for part of the macroblocks in the region of interest, and part of the macroblocks are encoded by a method of reducing the quantization parameter, or the content in the entire region of interest is encoded by the method of reducing the quantization parameter, and although these encoding methods cannot achieve the image effect by all using the I_PCM encoding, they still can enhance the image quality in the region of interest to some extent. In addition, it may be considered to assign more codewords to the encoding of the macroblocks contained in the region or object selected by the user while assigning fewer codewords to the encoding of the macroblocks outside the region or object of interest, according to the bandwidth sufficiency condition. On the contrary, when the reverse enhancement mode is used, fewer codewords may be assigned to the macroblocks contained in the region or object selected by the user, or the image in the region selected by the user may be blurred and then encoded before the encoding.

In fact, in some embodiments, for encoding using the forward enhancement and the reverse enhancement, in addition to using different encoding modes to achieve the encoding, more means can also be taken to ensure the implementation of algorithms, for example, when the local enhancement encoding device supports the H.264 encoding, since the H.264 supports a variety of flexible slice modes, enhancement encoding may be performed for the region or object selected by the user as a separate slice, which is more conducive to optimization of the encoding process.

On this basis, we assume that the region of interest selected by the user is a relatively important region, and an image code stream by encoding this region as a separate slice can be sent as a separate NALU (network adaptation layer unit) during sending, and according to the definition of H.264 standard, different transport priorities NRI may be given to different NALUs, and the values of the priorities NRI from high to low are 3,2,1,0, and when the NALU corresponding to the region selected by the user is sent, the value of the NRI is set as a specific value, and it is to allow the system to consider that the NALU where this specific value is located has an importance exceeding a general NALU, and thus certain measures are used in the transmission process to ensure the transmission reliability of such NALU, so even in the case of the relatively poor network environment, it can still be guaranteed that the image in the region of interest selected by the user can more reliably reach the receiving end and be viewed by the user. The means of ensuring that the NALU selected by the user has a higher importance certainly are not limited to the NRI setting method, but the purpose is also to better ensure that the user needs can be met. The encoding method and transmission method according to the present embodiment will be described in more detail in the following accompanying drawings and specific embodiments.

In some embodiments, the local enhancement encoding of the replacing mode is first performing replacement of the specified region or object for the original image before encoding at the encoding end and then encoding, while in some other embodiments, the local enhancement encoding of the replacing mode does not need a local image enhancement encoding device to perform any special operation, but after the far-end image is decoded out, local replacement is performed for the decoded image by the near end according to the user selection parameters. Of course, the local image enhancement encoding implementation methods are not limited to these methods, and local image enhancement technologies that meet the user needs can be developed in the device according to the actual situations.

Since the content of the present document can be used in a variety of video communication systems in different implementation modes, for the convenience of understanding, the present document will be further illustrated below in conjunction with the embodiments and the accompanying drawings.

Figure 2A:
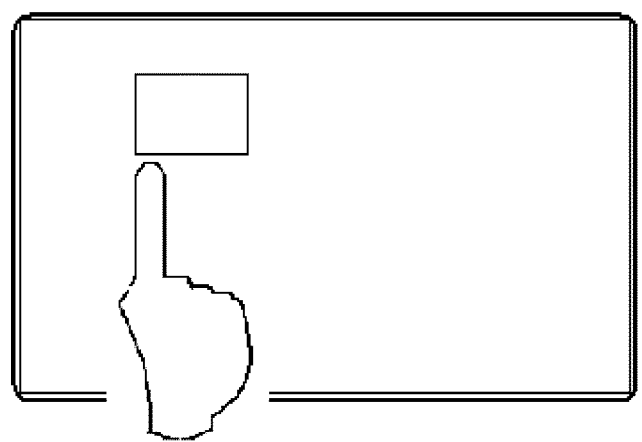
FIG. 2(a) is a schematic diagram of an operation of a user using a finger to select a region or object of interest in an image.
Figure 2B:
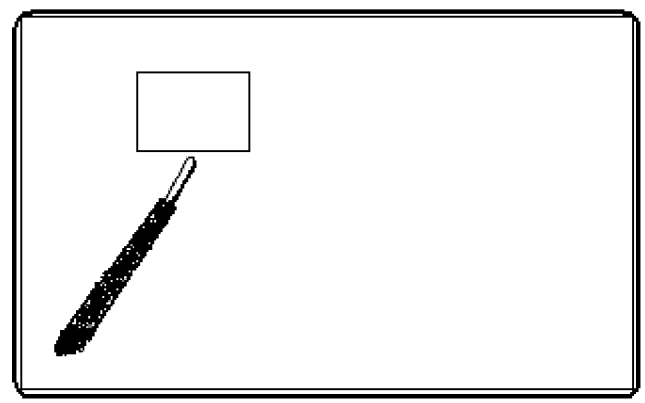
FIG. 2(b) is a schematic diagram of an operation of a user using a light pen to select a region or object of interest in an image.
Figure 2C:
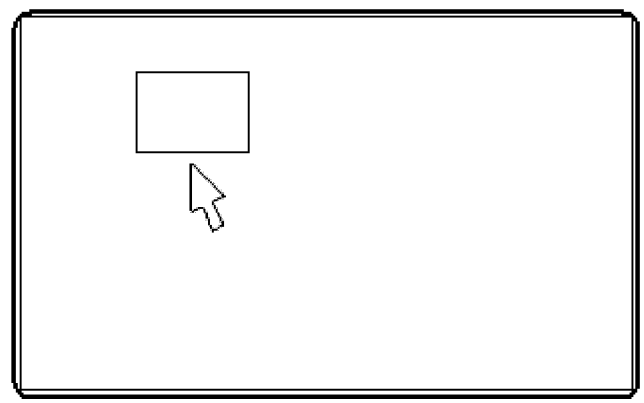
FIG. 2(c) is a schematic diagram of an operation of a user using a mouse to select a region or object of interest in an image.
Figure 2D:
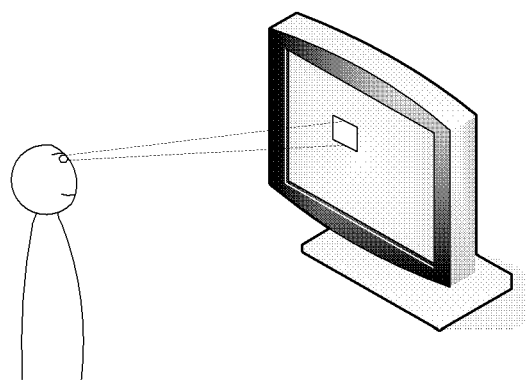
FIG. 2(d) is a schematic diagram of a user using an eye gaze method to select a region of interest in an image.

FIGS. 2(a), 2(b), 2(c) and 2(d) are schematic diagrams of embodiments of a user using different methods to select a region of interest in the image, respectively. FIG. 2(a) is a schematic diagram of using a finger to select a region of interest on the sensitive screen, wherein the outer big box in the figure is a display capable of sensing and recording the finger movement, and the small box inside the big box represents the region range selected by the user with a finger on the screen; FIG. 2(b) is a schematic diagram of using a stylus to select a region of interest of the image on the sensitive screen, wherein the big outer box in the figure is a display capable of sensing the stylus and recording the stylus movement, and the small box within the big box represents the region range selected by the user on the screen with the stylus; FIG. 2(c) is a schematic diagram of using a mouse to select a region of interest in the image, wherein the big box in the figure represents a display which is not necessarily a display dedicated to displaying a far-end image and may be a display of the controlling device, and there is a page in the display that may display the far-end image, so that a mouse can be used to select a region of interest in the far-end image displayed on the page, and the region of interest selected by the user is shown as the small block in the figure. FIG. 2(d) is a schematic diagram of the user using the eye gaze method to select a region of interest in the image, wherein the small blue box in the figure is the region of interest selected by the user in the image. The principle of using the eye gaze method to select a region of interest in an image is that: according to the relationship between the geometric center position of the user's eye cornea and the geometric center position of the display, when the position gazed by the user's eyes changes, the geometric center point of the eye cornea will deflect, and the system calculates to obtain the position currently gazed by the user on the display according to the relationship between the deflection angle of the geometric center of the user's eye cornea and the geometric center of the display, and if the duration of the user gaze is longer than a certain time limit, it is considered that the user is interested in the image at this position, and the system will prompt the user whether it needs to enhance the image at the position, as well as the range to be enhanced and the enhancement mode. The four embodiments listed here are only for briefly describing the method of a user selecting a region of interest in an image, and in an actual use, a variety of implementation methods may be used according to the screen material of the display and the system needs.

Figure 3:
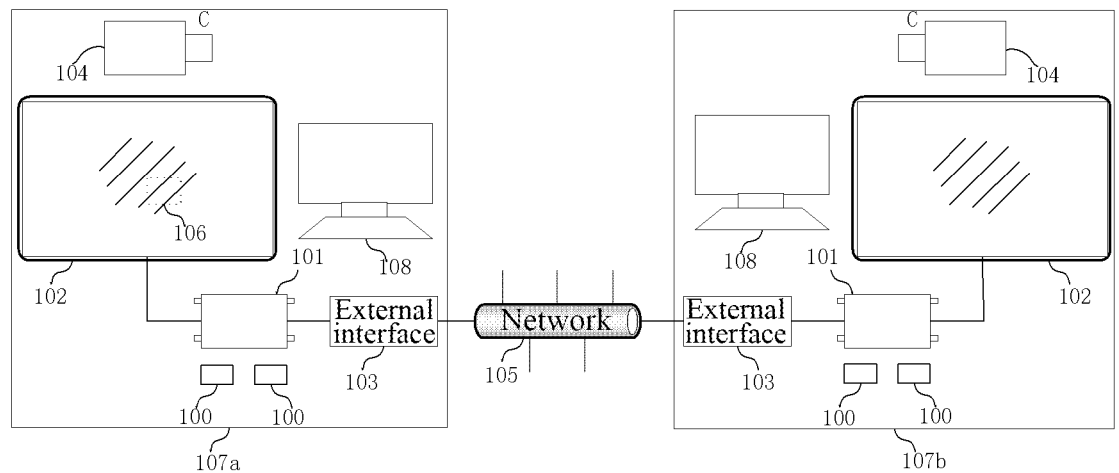
FIG. 3 is a block diagram of a double-ended system using local image enhancement provided in one specific embodiment of the present document.

FIG. 3 is a block diagram of an embodiment of a double-ended system using local image enhancement, wherein 107(a) in this figure indicates one end of the system, called the near end, 107(b) indicates the other end of the system, called the far end, the 107(a) and the 107(b) comprise: a processor 101, a display 102, an external interface 103, an image acquisition device 104, a system controlling device 108 which may be omitted as needed, and the 107(a) may also not comprise an image acquisition device 104, and the 107(b) may not comprise a display 102, wherein:

an image at the far end is displayed on the display 102, and the user 100 selects a region or object of interest 106 in the image displayed on the display 102 at the near end; the processor 101 at the near end processes and generates user selection parameters according to the region or object selected by the user 100, the user selection parameters are sent outwards via the external interface 103 at the near end and arrive at the far end through the transmission of the network 105;

the external interface 103 at the far end receives the user selection parameters sent by the network 105 and then sends them to the processor 101 at the far end, the processor 101 at the far end analyzes the user selection parameters, and if the user selection parameters are legal, then the encoding device in the processor 101 at the far end performs local enhancement encoding on the image acquired by the image acquisition device 104 according to the user selection parameters, and sends the enhanced image to the near end.

100 in FIG. 3 indicates a user using the video communication system that may be one person, several persons, or a group, 101 is a terminal device in the system which is referred to as a processor, and the processing of the entire system and some controlling, including controlling and operating the image acquisition device 104, taking the acquired image from the image acquisition device 104, as well as performing encoding and decoding processing on the audio and video, are completed in 101.

The display 102 itself may be in the same device as the processor 101, or may be coupled to the processor 101, some displays 102 support to directly select an image on the screen, for example, the displays as shown in FIG. 2(a) and FIG. 2(b), and some displays 102 do not support a selection operation directly on the screen, but may achieve the local selection operation on an image with the aid of the controlling device 108, and the schematic diagram of using a mouse to select a region of interest in the controlling device 108 is shown as FIG. 2(c).

The image acquisition device 104 is configured to acquire an image of local users and the surrounding thereof, and provide the image for the hardware or software which require the image in the system, for example, the acquired image may be sent to the local encoding device to encode, and then the encoded video stream is sent to the near end; likewise, the acquired image may be directly displayed on the local display device, and of course, the acquired image may be encoded and then stored. According to the system needs, the number of image acquisition device 104 at one end may not be fixed, and there may be one or a plurality of image acquisition devices. The number of display at one end of the system may also vary as needed, but is not fixed to one or a few. The image acquisition device 104 may be a video camera, a camera, and so on.

For a video communication system in which both ends use the local image enhancement technology, the system shown in FIG. 3 can be modified, added or removed as needed. For example, if the processor itself in the system can support the local image selection and the local image enhancement encoding, then the controlling device 108 in FIG. 3 can be deleted. As another embodiment, it may be to support the user to select a region of interest in the image in 107a, while it is to support the local image enhancement encoding in 107b, and the users at the 107a end can view an image at the 107b end, and select a region or object of their own interest in the image and then let the 107b end perform the local enhancement encoding, and the same operation can also be performed by changing 107a to 107b and 107b to 107a. Such embodiment may be used in, for example, video surveillance systems. As another embodiment, if both the 107a end and the 107b end support users to select a region or object of interest in the image, and the encoding devices all support the local image enhancement encoding, these two ends can complete local enhancement for an image at the local end, respectively, that is, the users at both ends can view the effect after local enhancement of the image at the local end as required.

The abovementioned double-ended system can be used in the same kind of video communication systems including a video conferencing system, such as the ZTE T700/T800/T900 video conferencing system.

Figure 4:
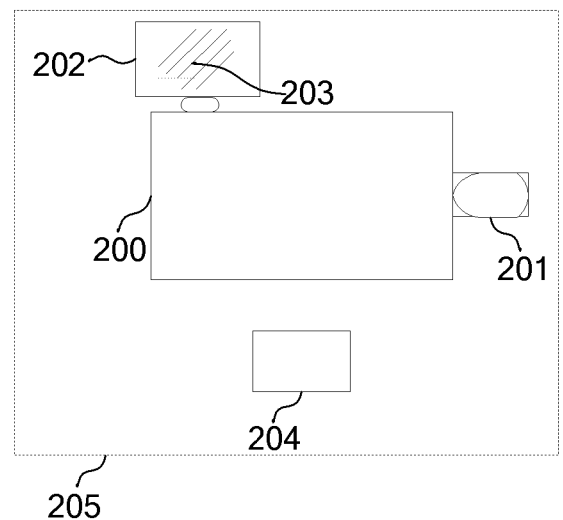
FIG. 4 is a block diagram of a single-ended system using local image enhancement provided in one specific embodiment of the present document.

FIG. 4 is a block diagram of a single-ended system using local image enhancement, wherein the single-ended system 205 comprises a processor 200, an image acquisition device 201, and a display 202, wherein:

the processor 200 is configured to process a local image, comprising: after receiving the selection parameters sent by the display 202, performing local enhancement encoding for the acquired image using a built-in local image enhancement encoding device; and, completing the internal operation and control functions of the entire system;

the image acquisition device 201 is configured to acquire a local image, and send the acquired image to the processor; the image acquisition device 201 may be a camera lens, a video camera, and so on;

the display 202 is configured to display the image frame acquired by the image acquisition device 201, and provide functions of performing a selection operation for the image, the user 204 can select a region or object of interest 203 in the image displayed on the display 202, and the display 202 obtains the region or target selected by the user and generates selection parameters, and then sends the selection parameters to the processor 200 for processing.

The single-ended system shown in the abovementioned embodiment may be used in a shooting device such as camera and video camera.

Figure 5A:
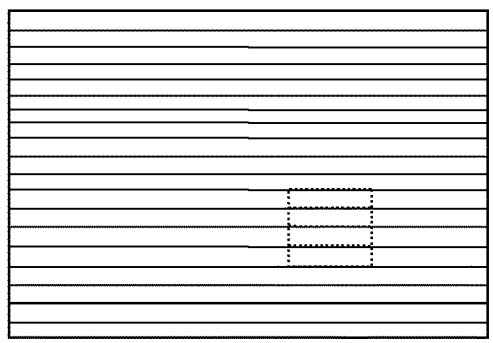
FIG. 5(a) and FIG. 5(b) are schematic diagrams of local image enhancement using a fixed tracking mode.
Figure 5B:
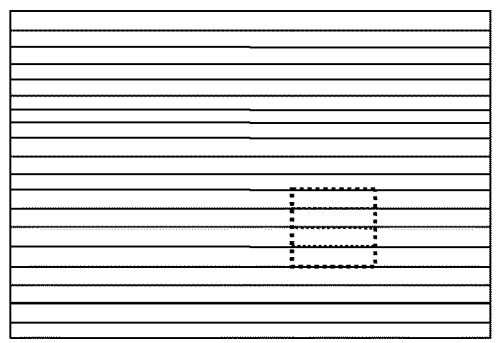

FIG. 5(a) and FIG. 5(b) are schematic diagrams of an embodiment of a user selecting a fixed tracking mode to perform local image enhancement, and in this embodiment, the user selects to perform local enhancement for the object at a fixed position in the image, wherein FIG. 5(a) shows that the user selects an object at the position of interest in the image and also selects the enhancement mode and enhancement level, and the selected tracking mode is a fixed mode, FIG. 5(b) shows the image effect in the fixed tracking mode, and it can be seen that the locally enhanced position in the image is the position of interest selected by the user; unless the user cancels the enhancement or selects a dynamic tracking mode, the system will keep performing local enhancement at this position in the image.

Figure 6A:
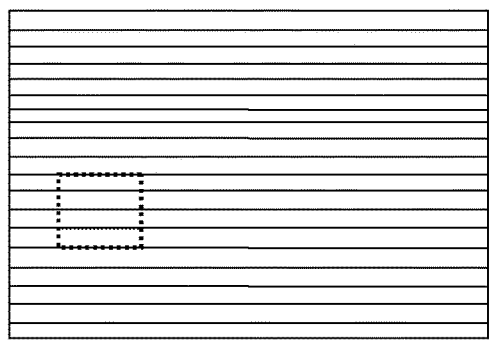
FIGS. 6(a), 6(b), 6(c) and 6(d) are schematic diagrams of local image enhancement using a dynamic tracking mode.
Figure 6B:
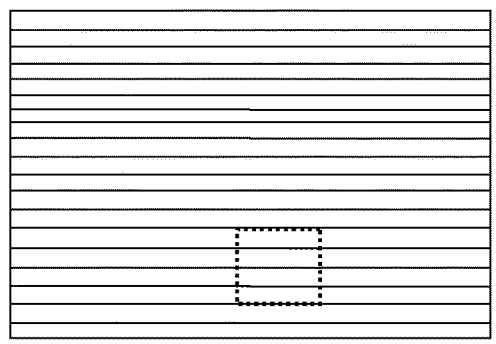
Figure 6C:
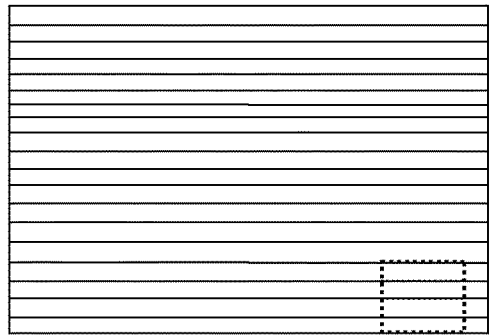
Figure 6D:
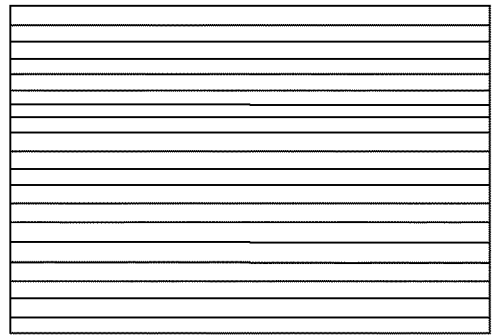

FIG. 6(a), FIG. 6(b) and FIG. 6(c) are schematic diagrams of an embodiment of a user selecting to use a dynamic tracking mode to perform local image enhancement, and in the present embodiment, the user selects to perform dynamic local enhancement for an object in the region of interest in the image, wherein FIG. 6(a) indicates that the user selects an object at the position of interest in the image, and selects the enhancement mode and enhancement level, and the selected tracking mode is a dynamic mode, in FIGS. 6(b) and 6(c), and in images at different times, the object in the region selected by the user keeps moving, and the enhanced region position also moves with the movement of the object, ensuring that the object of interest selected by the user is always within the locally enhanced region, and 6(d) is the case that the moving object moves out of the image displaying range, or the moving object reaches a position which is not suitable to be enhanced or the user cancels the local image enhancement, and at this time the image returns back to the default image quality.

It should be noted that the enhancement mentioned in the above content takes enhancement on a local region in an image as an example, and its enhancement mode is not limited. In an actual using process, the number or size of objects selected to be enhanced can be limited according to the actual situation.

Figure 7A:
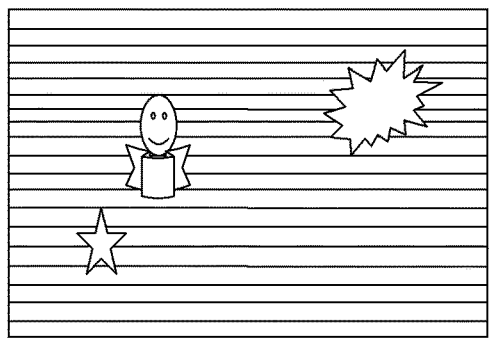
FIG. 7(a) and FIG. 7(b) are schematic diagrams of performing local image enhancement for an object selected by the user.
Figure 7B:
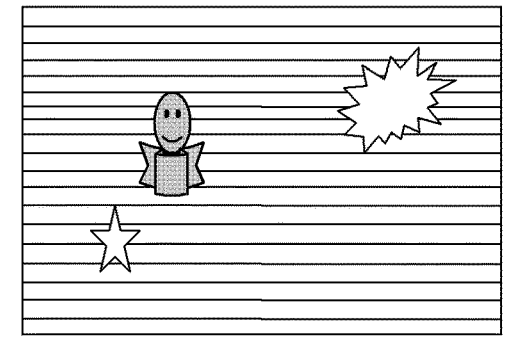

Similarly, in an actual use, individual objects in the image can be selected for image effect enhancement according to the system supporting situation, as shown in FIG. 7(a) and FIG. 7(b).

FIG. 7(a) indicates that there are a plurality of objects in the image, and the user selects one object (portrait in the figure) thereof, FIG. 7(b) indicates performing image enhancement for the object selected by the user, and of course, if the object selected by the user is moving, the dynamic tracking mode can be selected to perform tracking enhancement for the selected object.

FIG. 8(a) and FIG. 8(b) represent schematic diagrams of using slice groups in different formats to perform local image enhancement encoding. The divided regions in FIG. 8(a) indicate slices on the screen, and a total of N slices in FIG. 8(a) are numbered as 0, 1, ..., N–1; the regions boxed in FIG. 8(b) also indicate slices, and there are a total of M slices, numbered as 0, 1 ..., M–1, respectively, in FIG. 8(b). The dashed box in the figure indicates a region of interest selected by the user, and in some embodiments, the macroblocks contained in the region of interest selected by the user and using a forward enhancement mode are encoded with the I_PCM encoding mode, so that the region of interest selected by the user may achieve the best image quality; taking the prediction encoding mode supported by the H.264 standard as an example, compared with other prediction encoding modes, the greatest advantage of the I_PCM encoding mode is that fully lossless encoding can be achieved, while any other predictive encodings are lossy.

In addition, enhancement encoding can also be performed by the method of changing the number of codewords assigned to the macroblocks to be encoded, since it can be known according to the content of the H.264 standard that, the number of codewords assigned to the macroblocks has an important effect on the image quality, wherein the fewer the codewords assigned to the macroblocks, the more rough the image quality is, and on the contrary, the more the codewords assigned to the macroblocks, the finer the image quality is. Therefore, by controlling the number of codewords assigned to the macroblocks during encoding, the quality of video can be changed to some extent, and in actual implementation, for forward enhancement, the enhancement of video quality can be achieved by selecting the mode of encoding by decreasing a quantization parameter, or the mode of decreasing a quantization parameter in combination with the I_PCM encoding; for the reverse enhancement, it may be achieved by blurring the region to be encoded before encoding or by using a larger quantization parameter when encoding the region to be encoded.

According to the H.264 standard, one-frame image consists of at least one slice, and one slice also comprises a plurality of macroblocks, one macroblock can also be divided into a plurality of sub-blocks to be encoded respectively during encoding. The benefit of dividing one interframe prediction macroblock into a plurality of sub-blocks and then encoding the respective sub-blocks respectively is that each sub-block may have its own independent motion vector and prediction mode, which will enable not only a more accurate image prediction but also reducing of code rate.

FIG. 8(a) shows a schematic diagram of an embodiment of using a slice group in the raster scanning format to perform image encoding, that is, the sequence numbers of the respective slices are progressively incremented from top to bottom in turn, and during encoding or decoding, according to the raster scanning order, the respective macroblocks are encoded or decoded in turn from left to right, and from top to bottom. In this case, the region of interest selected by the user is likely to be divided into multiple slices, or may be included in one slice, so the purpose of enhancement encoding can be achieved as long as the encoder performs special encoding for the macroblocks in the region of the user's interest according to the user needs when the macroblocks are encoded, and after the encoding is completed, the code stream in the region of the user's interest is contained in a plurality of slices to be sent out or is contained in an ordinary slice to be sent out in accordance with the slice division situation.

According to the H.264 standard, the respective slices in one frame are mutually independent during encoding and decoding, i.e., they are encoded and decoded without mutually referring to the content of each other, while the H.264 standard also supports encoding in a flexible microblock ordering (FMO) slice group format, i.e. the macroblocks are not contained in the slice group in accordance with the raster scanning order but are mapped to the slice group in a certain mode, the FMO slice group has a total of six mapping types: interlacing mapping, scattering mapping, foreground and background mapping, Box out mapping, handkerchief mapping and explicit mapping, and the detailed description of these six mapping modes can refer to the H.264 related protocol standard.

FIG. 8(b) shows a schematic diagram of an embodiment of using a slice group format of foreground and background mapping to perform local enhancement encoding, and using this slice group format can encode the region of interest selected by the user in the image as a separate slice, and the image quality enhancement specified by the user is performed in the encoding process, while the other slices in one frame use the encoding of system default parameters, without need of performing the image quality enhancement. One benefit of doing so is that the slices encoded out from the region selected by the user can be encapsulated into one NALU to send, and then a higher transport priority can be assigned to this NALU, thereby allowing the system to use a certain method to ensure that the NALU has a higher reliability during the transmission process, i.e., it is not easy to be lost and the occurrence of error code does not easily occur.

The embodiments of the present document further provide a local image enhancing apparatus, as shown in FIG. 9, comprising:

a detection module configured to obtain a region or object selected by a user;

a parameter generation module configured to generate selection parameters according to the selected region or object;

a transmission module configured to send the selection parameters to the peer end.

Wherein, the parameter generation module is further configured to obtain an enhancement mode, or, an enhancement mode and an enhancement level, selected by the user, and add the enhancement mode, or, the enhancement mode and enhancement level, to the selection parameters.

Wherein, the selection parameters further comprise: a tracking mode, and the tracking mode is one of the following:

a fixed mode indicative of enhancing each frame in the selected region before canceling the enhancement;

a dynamic mode indicative of tracking the selected object for each frame before canceling the enhancement, and enhancing the object when the object is within the enhancement range.

Wherein, before the parameter generation module generates the selection parameters, it is further judged whether the peer end supports local enhancement encoding, and whether the selected region or object meets preset conditions, and only when the peer end supports the local enhancement encoding and the selected region or object meets the preset conditions, are the selection parameters generated.

The embodiments of the present document further provide a local image enhancing apparatus, as shown in FIG. 10, comprising:

a receiving module configured to receive selection parameters sent by a peer end and generated according to a region or object selected by a user;

an enhancing module configured to enhance the selected region or object in accordance with the selection parameters;

a sending module configured to send the image of the enhanced selected region or object to the peer end.

Wherein, the step of the enhancing module enhancing the selected region or object comprises:

enhancing the selected region or object according to an enhancement mode, or, an enhancement mode and an enhancement level, in the selection parameters.

Wherein, the step of the enhancing module enhancing the selected region or object comprises:

when the selection parameters are indicative of increasing image quality of the selected region or object, using one of the following modes or a combination thereof:

using an I_PCM encoding mode to encode an image of the selected region or object;

encoding the image of the selected region or object by decreasing a quantization parameter of encoded macroblocks;

encoding the image of the selected region or object by increasing codewords of the encoded macroblocks;

when the selection parameters are indicative of decreasing image quality of the selected region or object, using one of the following modes or a combination thereof:

encoding an image of the selected region or object by increasing a quantization parameter of encoded macroblocks;

encoding the image of the selected region or object by decreasing codewords of the encoded macroblocks; and blurring and then encoding the image of the selected region or object.

Wherein, the enhancement module is further configured to encode the selected region or object as a separate slice;

the sending module is further configured to take the separate slice as an individual network adaptation layer unit, and set a specific transport priority for the network adaptation layer unit.

Wherein, before the enhancement module enhances the selected region or object according to the selection parameters, it is further judged whether the selection parameters meet preset conditions, and if yes, the selected region or object is enhanced according to the selection parameters.

Figure 11:
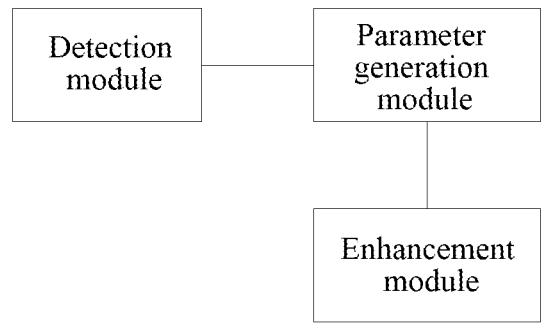
FIG. 11 is a block diagram of a local image enhancing apparatus in accordance with one embodiment of the present document.

The embodiments of the present document further provide a local image enhancing apparatus, as shown in FIG. 11, comprising a detection module, a parameter generation module and an enhancement module, wherein:

the detection module is configured to obtain a region or object selected by a user;

the parameter generation module is configured to generate selection parameters according to the selected region or object and send the selection parameters to the enhancement module;

the enhancement module is configured to enhance the selected region or object according to the selection parameters, and generate an image of the enhanced selected region or object.

Wherein, the parameter generation module is further configured to obtain an enhancement mode, or, an enhancement mode and an enhancement level, selected by the user, and add the enhancement mode, or, the enhancement mode and enhancement level, to the selection parameters;

the enhancement module enhancing the selected region or object comprises:

enhancing the selected region or object according to the enhancement mode, or, the enhancement mode and enhancement level, in the selection parameters.

Wherein, the selection parameters further comprise: a tracking mode, and the tracking mode is one of the following:

a fixed mode indicative of enhancing each frame in the selected region before canceling the enhancement;

a dynamic mode indicative of tracking the selected object for each frame before canceling the enhancement, and enhancing the object when the object is within an enhancement range.

Wherein, the step of the enhancement module enhancing the selected region or object comprises:

when the selection parameters are indicative of increasing image quality of the selected region or object, using one of the following modes or a combination thereof:

using an I_PCM encoding mode to encode an image of the selected region or object;

encoding the image of the selected region or object by decreasing a quantization parameter of encoded macroblocks;

encoding the image of the selected region or object by increasing codewords of the encoded macroblocks;

when the selection parameters are indicative of decreasing image quality of the selected region or object, using one of the following modes or a combination thereof:

encoding an image of the selected region or object by increasing a quantization parameter of encoded macroblocks;

encoding the image of the selected region or object by decreasing codewords of the encoded macroblocks;

blurring and then encoding the image of the selected region or object.

The embodiments of the present document further provide a local image enhancing system, comprising the apparatuses shown in FIG. 9 and FIG. 10.

It should be noted that multiple details described in the abovementioned method embodiments are also applicable to the apparatus embodiments, and therefore the repeated description for the same or similar parts is omitted herein.

Those ordinarily skilled in the art can understand that all or part of steps of the abovementioned method may be completed by programs instructing the relevant hardware, and the abovementioned programs may be stored in a computer-readable storage medium, such as read only memory, magnetic or optical disk. Alternatively, all or part of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

INDUSTRIAL APPLICABILITY

The local image enhancement method and apparatus provided in the embodiments of the present document allow users to select image quality of a region or object of their own interest fully according to their own preferences; furthermore, it can achieve lossless enhancement; in addition, it can further decrease image quality of the region or object selected by the users. Certainly, any product carrying out the embodiments of the present document does not necessarily need to reach all of the abovementioned advantages at the same time.

What is claimed is:

1. A local image enhancing method, comprising:

obtaining, by a display capable of displaying the far-end image and performing a local selection operation for an image, a region or object selected by a user;

generating, by a processor, selection parameters defining the selected region or object and selected by the user to indicate desired image quality effect of the selected region or object; wherein the selection parameters comprise: an enhancement mode, or, an enhancement mode and an enhancement level, the enhancement mode is one of the following: a forward enhancement mode indicative of increasing image quality of the selected region or object; a reverse enhancement mode indicative of decreasing image quality of the selected region or object; a replacing mode indicative of using another image to replace the selected region or object; a non-enhancement mode indicative of the image quality of the selected region or object being a system default;

enhancing, by the processor, the selected region or object according to the selection parameters, and generating an image of the enhanced selected region or object;

wherein, the step of enhancing the selected region or object comprises:

when the selection parameters are indicative of increasing image quality of the selected region or object, using one of the following modes or a combination thereof:

using an I_PCM encoding mode to encode an image of the selected region or object;

encoding the image of the selected region or object by decreasing a quantization parameter of encoded macroblocks;

encoding the image of the selected region or object by increasing codewords of the encoded macroblocks;

when the selection parameters are indicative of decreasing image quality of the selected region or object, blurring and then encoding the image of the selected region or object;

when the selection parameters are indicative of replacing the selected region or object, replacing the selected region or object using another image, wherein content of the another image is different from content of the selected region or object.

2. The method of claim 1, wherein the selection parameters further comprise:

a tracking mode, wherein the tracking mode is one of the following:

a fixed mode indicative of enhancing each frame in the selected region before canceling the enhancement;

a dynamic mode indicative of tracking the selected object for each frame before canceling the enhancement, and enhancing the object when the object is within the enhancement range.

3. A local image enhancing method, comprising:

receiving, by an external interface, selection parameters defining a selected region or object sent by a peer end and selected by a user to indicate desired image quality effect of the selected region or object; wherein the selection parameters comprise: an enhancement mode, or, an enhancement mode and an enhancement level, the enhancement mode is one of the following: a forward enhancement mode indicative of increasing image quality of the selected region or object; a reverse enhancement mode indicative of decreasing image quality of the selected region or object; a replacing mode indicative of using another image to replace the selected region or object; a non-enhancement mode indicative of the image quality of the selected region or object being a system default;

enhancing, by a processor, the selected region or object according to the selection parameters;

sending, by the external interface, an image of the enhanced selected region or object to the peer end;

wherein, the step of enhancing the selected region or object comprises:

when the selection parameters are indicative of increasing image quality in the selected region or object, using one of the following modes or a combination thereof:

using an I_PCM encoding mode to encode an image of the selected region or object;

encoding the image of the selected region or object by decreasing a quantization parameter of encoded macroblocks;

encoding the image of the selected region or object by increasing codewords of the encoded macroblocks;

when the selection parameters are indicative of decreasing image quality of the selected region or object, blurring and then encoding the image of the selected region or object;

when the selection parameters are indicative of replacing the selected region or object, replacing the selected region or object using another image, wherein content of the another image is different from content of the selected region or object.

4. The method of claim 3, wherein, the step of enhancing the selected region or object according to the selection parameters comprises:

encoding the selected region or object as a separate slice;

before sending an image of the enhanced selected region or object to the peer end, further taking the separate slice as an individual network adaptation layer unit, and setting a specific transport priority for the network adaptation layer unit, or, wherein, before enhancing the selected region or object according to the selection parameters, it is further judged whether the selection parameters meet preset conditions, and if yes, the selected region or object is enhanced according to the selection parameters.

5. A non-transitory computer readable storage medium, wherein the storage medium is configured to store a computer program which, when executed by a processor, causes the processor to implement the method according to claim 1.

* * * * *